(12) United States Patent
Yang et al.

(10) Patent No.: US 7,159,773 B2
(45) Date of Patent: Jan. 9, 2007

(54) CARD CONNECTOR HAVING SWITCH CONTACTS

(75) Inventors: Meng Huan Yang, Tu-Chen (TW); Tien-Chieh Su, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 191 days.

(21) Appl. No.: 11/025,192

(22) Filed: Dec. 28, 2004

(65) Prior Publication Data

US 2005/0194443 A1   Sep. 8, 2005

(30) Foreign Application Priority Data

Mar. 3, 2004   (CN)   .................. 2004 2 0025241

(51) Int. Cl.
*G06K 7/06* (2006.01)
(52) U.S. Cl. .................. 235/441; 235/475; 235/479
(58) Field of Classification Search .................. 235/441, 235/479, 475
See application file for complete search history.

(56) References Cited

U.S. PATENT DOCUMENTS

| | | | |
|---|---|---|---|
| 5,511,986 A | 4/1996 | Casey et al. | |
| 6,425,775 B1 * | 7/2002 | Chang et al. | ................ 439/188 |
| 6,547,601 B1 | 4/2003 | Oguchi | |
| 6,644,550 B1 * | 11/2003 | Pickles | ........................ 235/486 |
| 6,692,277 B1 * | 2/2004 | Hu et al. | ..................... 439/188 |

* cited by examiner

*Primary Examiner*—Seung Ho Lee
(74) *Attorney, Agent, or Firm*—Wei Te Chung

(57) ABSTRACT

A card connector (100) provided for interconnecting the card to an external circuit board includes an insulative housing (1), a number of terminals (2) retained in the housing for electrically connecting with the card, and first and second spring switch contacts (31, 32). The first and second spring switch contact respectively include a first and second lead (311, 312) secured in the housing and extending outwardly for electrical connection with an external circuit board, and a generally U-shaped first and second deflectable body portion (312, 322). The first deflectable body portion has a first free leg (314) defining a first spring contact portion (3140). The second deflectable body portion has a second free leg (324) having a deflecting portion (3241) adapted to be actuated by the card in direct response to insertion thereof and a second spring contact portion (3240) adapted for engaging with said first spring contact portion.

15 Claims, 5 Drawing Sheets

CARD CONNECTOR HAVING SWITCH CONTACTS

BACKGROUND OF THE INVENTION

1. Filed of the Invention

The present invention relates to a card connector, and more particularly to a card connector capable of reliably holding an inserted card.

2. Description of the Prior Art

Known IC cards have memory and/or an IC for serving as a control circuit. By loading such an IC card into electronic apparatuses such as cellular phones, telephones, PDAs, cameras and the like, functions of these electronic apparatuses can be enhanced. Examples of such IC cards include memory cards such as Subscriber Identity Module Card (SIM card), Multi Media Card (MMC), Smart Media, Secure Digital Card (SD card), Memory Stick, and Compact Flash Card.

Card connectors are provided for connecting such cards to circuit boards of the electronic devices. Switches have been designed into such conventional card connectors for the purpose of detecting the presence of inserted cards. See, for example, U.S. Pat. No. 5,511,986. Generally a switch includes an unmovable contact and a movable contact. The unmovable contact and the movable contact are normally spaced-apart. When the card is inserted into the card connector, the movable contact is deflected to contact with the unmovable contact by the inserted card. Therefore, the switch is actuated by the presence of the inserted card.

Another design for detecting the insertion and/or extraction of an card is disclosed in U.S. Pat. No. 6,547,601 B2, issued to Oguchi. The Oguchi card connector includes a movable contact located on one side of a frame, and a metallic shell having a side plate positioned at side edges of the frame to serve as an unmovable contact of a switch.

However, in the above structure of the detector switch used in the conventional card connector, the movable switch terminal is easily to be intolerant and out of condition after being repeated deflected by the inserted card. Moreover, the card itself is of dimension tolerance. When the card is of negative dimension tolerance, the movable contact of the switch may not get sufficient pressing force from the inserted card, resulting in an unreliable connection between the movable contact and the unmovable contact and rendering the switch inoperative. When the card is of positive dimension tolerance, the movable contact of the switch may accept excessive pressing force from the inserted card and easily to be damaged, resulting in a short life-span thereof. As the size of connectors decreases, it has become extremely desirable for connectors to have improved switch contacts to solve the above-mentioned shortcomings.

Subsequent efforts to provide a card connector structure characterized by modifying the unmovable contact is disclosed in U.S. Pat. No. 6,692,277 B2 and assigned to the same assignee of this invention. A switch in this patent includes a pair of spring switch contacts. Although this design is used in many applications, there is broadly space for improving.

Therefore, The present invention is directed to further improvements in switch contacts structures to solve one or more of the above myriad of interrelated problems presently occurring in card connectors.

BRIEF SUMMARY OF THE INVENTION

A main object of the present invention is to provide a card connector having an improved reliable switch for detecting the presence of an insertion card.

Another object of the present invention is to provide a card connector which is robust and durable.

A card connector mounted on an external circuit board adapted for accepting a card includes an insulative housing defining a card receiving space for accommodating the card, a plurality of contacts retained in the housing for electrically connecting with the card, and first and second spring switch contacts located on the insulative housing to be directly actuated by the card in direct response to insertion thereof. The first spring switch contact includes a first lead secured in the housing and extending outwardly for electrical connection with an external circuit board, and a deflectable body portion. The first deflectable body has a first connecting leg continuing from the first lead and a first free leg extending from the first connecting leg with a turnover section, The first free leg defines a first spring contact portion. The second spring switch contact includes a second lead secured in the housing and extending outwardly for electrical connection with the external circuit board, and a second deflectable body portion. The second deflectable body portion has a second connecting leg continuing from the second lead and a second free leg extending at an angle from the second connecting leg and backwardly toward the second lead. The second free leg has a deflecting portion adapted to be actuated by the card in direct response to insertion thereof and a second spring contact portion adapted for engaging with said first spring contact portion 23.

When the card is inserted into the card connector, the second deflecting portion of the second spring switch contact is actuated by the card and moves outwardly, rendering the second spring contact portion to abut against the first spring contact portion of the first spring switch contact. The first spring contact portion is sufficient resilient to prevent any damage to the switch construction. When the card is to be ejected, the inserted card is slightly pushed forwardly. As a result, the deflecting portion of the second spring switch contact and the first spring contact portion of the first spring switch contact 31 are sufficiently resilient to come back to their normal states. Therefore, the presence and the absence of the card can be detected directly by the electrical switch 3 and the circuit traces on the external circuit board.

Other objects, advantages and novel features of the invention will become more apparent from the following detailed description when taken in conjunction with the accompanying drawings.

DETAILED DESCRIPTION OF THE INVENTION

Figure 1:
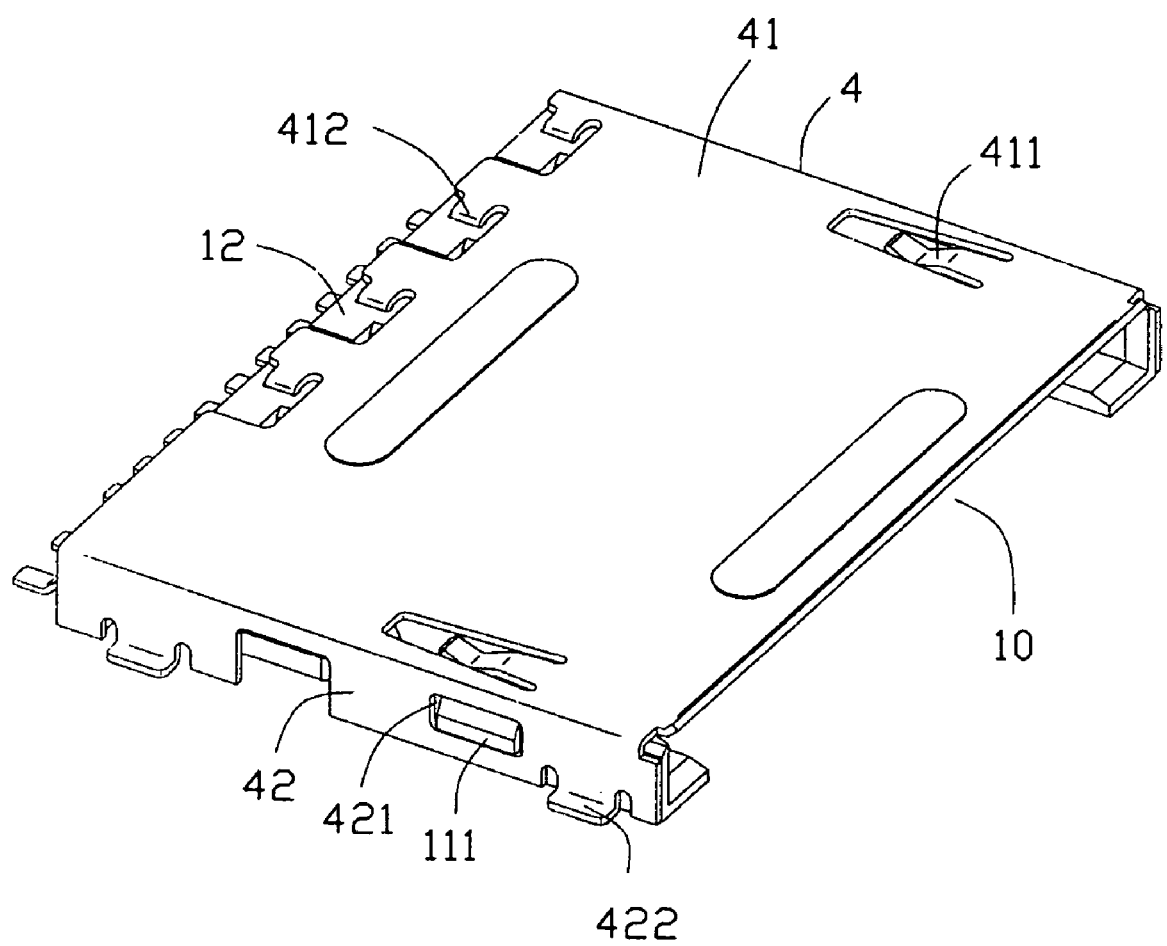
FIG. 1 is a perspective view of a card connector according to the present invention.

The present invention will now be described with reference to drawings, and first to FIGS. 1 and 2. A card connector 100 according to the present invention is provided for interconnection between a card (not shown), such as a memory card, and a circuit board (not shown). The card connector 100 includes an insulative housing 1, a plurality of conductive terminals 2 mounted on the housing 1 adapted for electrically connecting with the card, an electrical switch 3 for detecting the presence or absence of the card, and an outer shell 4 substantially covering the housing 1.

Figure 2:
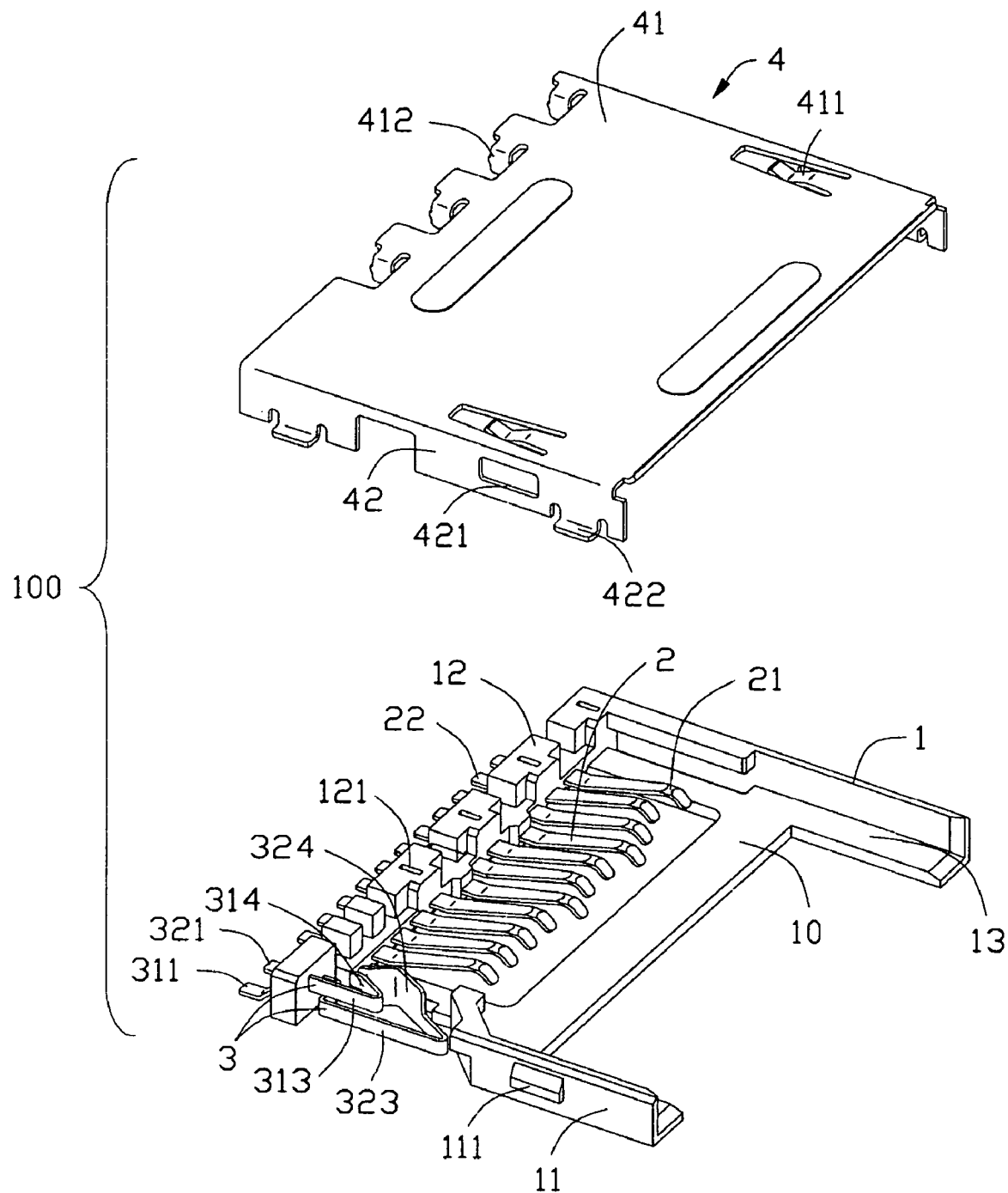
FIG. 2 is an exploded view of FIG. 1.
Figure 3:
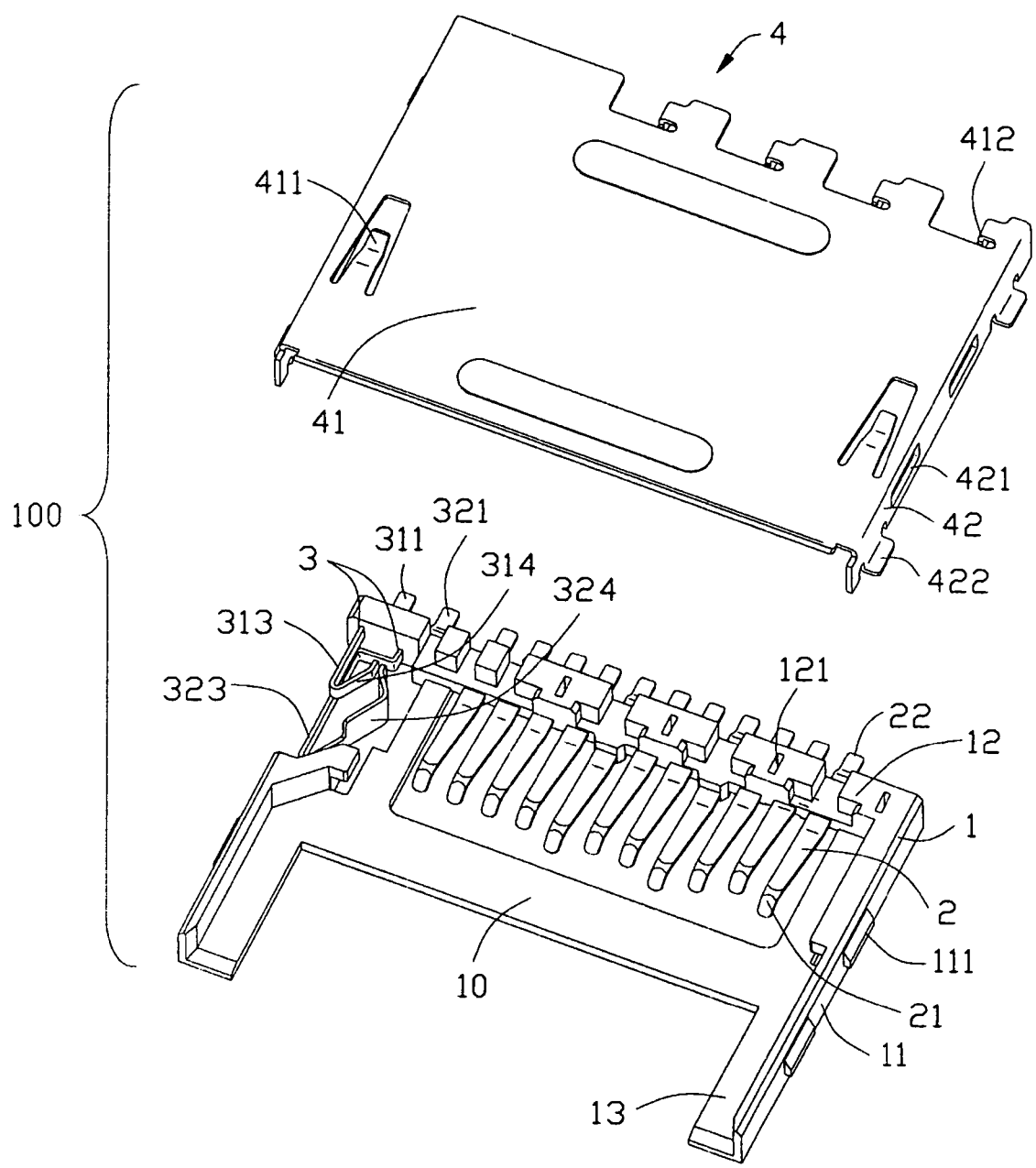
FIG. 3 is another exploded view of FIG. 1.

As best shown in FIGS. 2 and 3, the insulative housing 1 comprises a base plate 13 and a U-shaped peripheral frame (not labeled) substantially surrounding the base plate 13. The U-shaped peripheral frame includes a rear rim 12 and a pair of side rims 11 interconnecting end-to-end and upwardly extending form the respective left, right and rear sides of the base plate 13. Thus, a card receiving space 10 is defined by the frame and the base plate 13. The frame has a front opening (not labeled), through which the card is inserted into the card receiving space 10. Each of the side rims 11 has a plurality of projecting portions 111 extending outwardly for engaging with the outer shell 4. The rear rim 12 defines a plurality of upwardly-opening retention holes 121.

The conductive terminals 2 are mounted on the rear rim 12 of the housing 1. Each terminal 2 comprises a contacting beam 21 adapted for mating with the card and a rear finger 22 extending beyond the rear rim 12. In this embodiment of the present invention the rear fingers 22 of the terminals 2 are surface soldered on an external circuit board (not shown) on which the card connector 100 is mounted.

Figure 4:
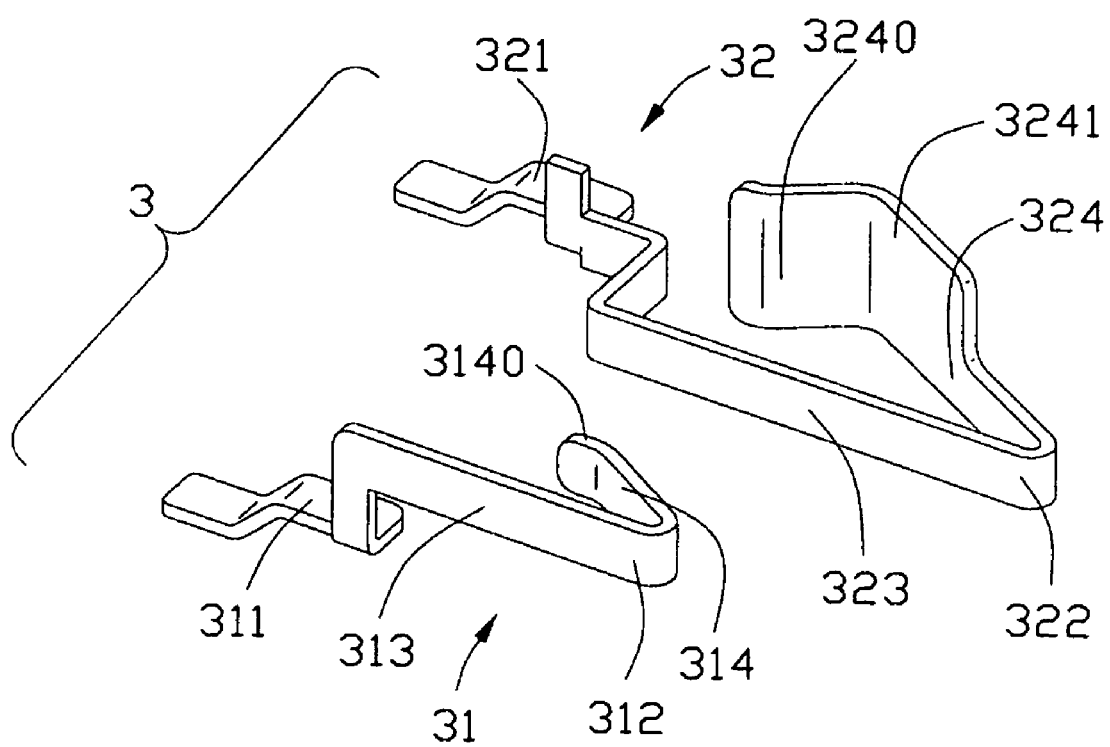
FIG. 4 is an exploded view an electrical switch shown in FIG. 2.
Figure 5:
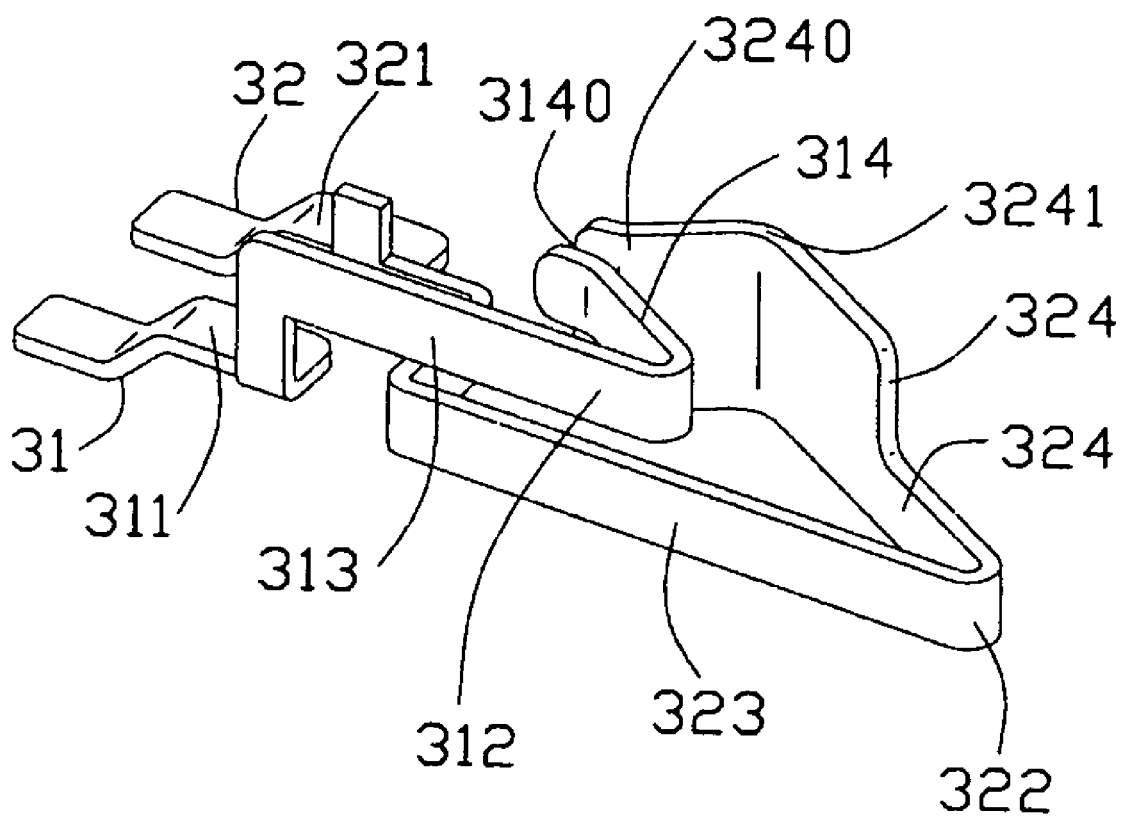
FIG. 5 is a perspective view of the switch shown in FIG. 2.

As best seen in FIGS. 4 and 5, the electrical switch 3 are also located at the rear rim 12 of the housing 1 in this embodiment of the present invention. The electrical switch 3 includes a first spring switch contact 31 and a second spring switch contact 32 located proximate to the first spring switch contact 31. The first spring switch contact 31 comprises a first lead 311 secured in the rear rim 12 of the housing 1 and extending outwardly for electrical connection with the external circuit board, and a first deflectable body portion 312. The first deflectable body portion 312 includes a first connecting leg 313 continuing extending from the first lead 311 and a first free leg 314 extending inwardly and backwardly from a front end of the first connecting leg 313, thereby forming a first turnover section (not labeled) between the first connecting leg 313 and the first free leg 314. The first free leg 314 has a vertex first spring contact portion 3140 in a free end thereof for engaging with the second spring switch contact 32. The second spring switch contact 32 includes a second lead 321 secured in the rear rim 12 and extending outwardly for electrical connection with the external circuit board, and a second deflectable body portion 322. The second deflectable body portion 322 comprises a second connecting leg 323 extending forwardly from the second lead 321, and a second free leg 324 extending inwardly and backwardly from the front end of the connecting leg 323. The second free leg 324 is curved and has a second spring contact portion 3240 adapted to engaging with the first spring contact portion 3140 and a deflecting portion 3241 on a distal end adapted to be actuated by the inserted card.

Referring to FIGS. 1–3, the outer shell 4 is stamped from a metal sheet and comprises a top plate 41 and a pair of side plates 42. The top plate 41 has a pair of elastic clips 411 integrally formed therewith respectively for resisting the inserted card. The top plate 41 further has a plurality of press-fit tabs 412 in the rear portion thereof for engaging with the retention holes 121 of the housing 1. Each side plate 42 defines a plurality of locking holes 421 for engaging with corresponding projecting portions 111 of the housing 1, and a plurality of fixing portions 422 extending outwardly and horizontally for engaging with a grounding trace on the external circuit board.

Referring to FIGS. 1–5, in assembly, the conductive terminals 2 are mounted on, such as insert molding, the housing 1 with contacting beam 21 extending into the card receiving space 10 for mating with the card and a rear finger 22 extending beyond the rear rim 12. The first and second spring switch contacts 31, 32 are assembled to the housing 1. The first and second leads 311, 321 are respectively located in the rear rim 12 of the housing 1 and extending rearwardly beyond the rear rim 12 for electrically connecting with circuit traces of the external PCB. The first connecting leg 313 is located above the second connecting leg 323. The second free leg 324 of the second spring switch contact 32 projects into the card receiving space 10, and the first free leg 314 of the first spring switch contact 31 is positioned at outer side edge of the second free leg 324. It should be noted that the first and second spring contacts 31, 32 are normally spaced-apart. The second free leg 324 is partially enlarged so as to establish a reliable connection between the second spring contact portion 3240 and the first spring contact portion 3140 when the card is inserted into the card connector 100. The outer shell 4 then covers the housing 1. The press-fit tabs 412 of the top plate 41 of the outer shell 4 are interferential fitted in the retention holes 121 of the rear rim 12. The locking holes 421 of the side plates 42 of the outer shell 4 respectively hold the projecting portions 111 therein.

In using, when the card that has negative dimension tolerance is inserted into the card connector 100, the second deflecting portion 3241 of the second spring switch contact 32 is actuated by the card and moves outwardly, rendering the second spring contact portion 3240 abutting against the first spring contact portion 3140 of the first spring switch contact 31. At this time, the circuit traces on the external circuit board are in direct response to insertion of the card. When the card that has positive dimension tolerance is inserted into the card connector 100, the second spring switch contact 32 accepts excessive pressing force from the card and moves outwardly to deflect the first spring contact portion 3140 outwardly together. The first spring contact portion 3140 is sufficient resilient to prevent any damage to the switch construction. Therefore, a reliable and durable switch is ensured, and the presence of the card can be detected accurately.

When the card is extracted from the card connector 100, the deflecting portion 3241 of the second spring switch contact 32 and the first spring contact portion 3140 of the first spring switch contact 31 are sufficiently resilient to come back to their normal states. Therefore, the absence of the card can be detected directly by the electrical switch 3 and the circuit traces on the external circuit board.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector adapted for accepting a card, the card connector comprising:

an insulative housing defining a card receiving space for accommodating the card;

a plurality of contacts retained in the housing for electrically connecting with the card; and first and second spring switch contacts held by the insulative housing for being directly actuated by the card in direct response to insertion thereof;

said first spring switch contact including a first lead secured in the housing and extending outwardly for electrical connection with an external circuit board, a first free leg having a first spring contact portion, a first connecting leg extending between the first lead and the first free leg with a turnover section disposed between the first connecting leg and the first free leg;

said second spring switch contact including a second lead secured in the housing and extending outwardly for electrical connection with the external circuit board, a second connecting leg continuing from the second lead, and a second free leg extending at an angle from the second connecting leg and backwardly toward the second lead, the second free leg having a deflecting portion adapted to be actuated by the card in direct response to insertion thereof and a second spring contact portion adapted for engaging with said first spring contact portion.

2. The card connector according to claim 1, wherein the first spring switch contact is spaced away from the second spring switch contact in a normally open condition.

3. The card connector according to claim 1, wherein the first and second spring contact portions are respectively located at free ends of the first and second free legs of the first and second spring switch contacts.

4. The card connector according to claim 1, wherein the first connecting leg of the first spring switch contact is located above the second connecting leg of the second spring switch contact.

5. The card connector according to claim 1, wherein the first spring contact portion of the first spring switch contact is positioned at a side of the second spring contact portion of the second spring switch contact.

6. The card connector according to claim 1, wherein the insulative housing includes a base plate and a U-shaped peripheral frame substantially surrounding the base plate, and wherein the first and second spring switch contacts are mounted on the frame.

7. The card connector according to claim 6, further including a metal outer shell substantially covering the housing.

8. The card connector according to claim 7, wherein the frame of the housing defines a plurality of retention holes, and wherein the metal outer shell has a plurality of press-fit tabs engaging with corresponding retention holes.

9. The card connector according to claim 7, wherein the metal outer shell has a top plate having an elastic clip integrally formed therewith for resisting the inserted card.

10. A card connector for providing an interconnection between a card and a circuit board, the card connector comprising:

an insulative housing defining a card receiving space for accepting the card;

a plurality of terminals mounted on the insulative housing adapted for interconnection of the card to electrical traces on the circuit board; and an electrical switch positioned in the housing adapted for detecting the presence or absence of the card, the switch including a first and second spring switch contacts, each of the switch contacts including a lead fixed in the housing adapted to be electrically interconnected to the electrical trace on the circuit board, the first spring switch contact having a first deflectable contacting leg projecting into the card receiving space, the second spring switch contact including a connecting leg having one end continuing from the lead thereof, and a second deflectable contacting leg extending inwardly toward the card receiving space from the other end of the connecting leg and backwardly extending toward the lead of the second spring switch contact;

wherein when the card is properly inserted, the first deflectable contacting leg is actuated by the card and urged to deflectably engage with the second deflectable contact leg.

11. A card connector adapted for accepting a card, the card connector comprising:

an insulative housing defining a card receiving space for accommodating insertion of the card in a front-to-back direction;

a plurality of contacts arranged in the housing along a transverse direction perpendicular to said front-to-back direction for electrically connecting with the card; and first and second spring switch contacts held by the insulative housing for being directly actuated by insertion of the card to be engaged with each other;

the first and second spring switch contacts including respective first and second mounting tails arranged spaced from each other in said transverse direction, respective first and second connection legs respectively forwardly extending out of the housing in a mutually parallel spaced manner in a vertical plane which extends in said front-to-back direction, and respective first and second deflectable curved free legs generally extending respectively from the corresponding first and second connection legs; wherein said first and second deflectable curved free legs are located inside of said first and second connection legs along said transverse direction, and at least one of said first and second deflectable curved free legs is enlarged in a vertical direction to be able to be overlapped and engaged with the other transversely when at least one of said first and second deflectable curved free legs is outwardly transversely deflected by the insertion of the card.

12. The card connector as claimed in claim 11, wherein said at least one of the first and second deflectable curved free legs, which is enlarged in the vertical direction, is located inside of the other along said transverse direction.

13. The card connector as claimed in claim 11, wherein said at least one of the first and second deflectable curved free legs, which is outwardly transversely deflected by the insertion of the card, is located inside of the other along said transverse direction.

14. The card connector as claimed in claim 11, wherein said at least one of the first and second deflectable curved free legs, which is outwardly transversely deflected by the insertion of the card, is also the at least one of the first and second deflectable curved free legs which is enlarged in the vertical direction.

15. The card connector as claimed in claim 11, wherein both said first and second deflectable curved free legs are outwardly transversely deflected by the insertion of the card.

* * * * *